US012669820B2

(12) United States Patent
Doy et al.

(10) Patent No.: US 12,669,820 B2
(45) Date of Patent: Jun. 30, 2026

(54) SYSTEM AND METHOD FOR RESPONDING TO OBSTACLES IN WORKSITES USING AUTONOMOUS MACHINES

(71) Applicant: Caterpillar Paving Products Inc., Brooklyn Park, MN (US)

(72) Inventors: Nathaniel S Doy, Maple Grove, MN (US); John L. Marsolek, Watertown, MN (US); Robert J. McGee, Peoria, IL (US); Sangameshwar Sonth, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 333 days.

(21) Appl. No.: 18/138,654

(22) Filed: Apr. 24, 2023

(65) Prior Publication Data

US 2024/0353837 A1 Oct. 24, 2024

(51) Int. Cl.
| | |
|---|---|
| *G05D 1/02* | (2020.01) |
| *G05B 19/4155* | (2006.01) |
| *G05D 1/00* | (2006.01) |
| *G06V 10/764* | (2022.01) |
| *G06V 20/17* | (2022.01) |
| *G06V 20/52* | (2022.01) |
| *G06V 20/58* | (2022.01) |

(52) U.S. Cl.
CPC ....... *G05D 1/0214* (2013.01); *G05B 19/4155* (2013.01); *G05D 1/0287* (2013.01); *G06V 10/764* (2022.01); *G06V 20/17* (2022.01); *G06V 20/52* (2022.01); *G06V 20/58* (2022.01); *G05B 2219/39091* (2013.01)

(58) Field of Classification Search
CPC .... G05D 1/0214; G05D 1/0287; G06V 20/17; G06V 20/52; G06V 20/58; G06V 10/764; G05B 19/4155; G05B 2219/39091
USPC .......................................................... 701/27
See application file for complete search history.

(56) References Cited

U.S. PATENT DOCUMENTS

| | | | |
|---|---|---|---|
| 6,539,294 B1 | 3/2003 | Kageyama | |
| 9,836,059 B2 | 12/2017 | Hiramatsu et al. | |
| 10,416,676 B2 | 9/2019 | Naka et al. | |
| 11,054,831 B2 | 7/2021 | O'Donnell et al. | |

(Continued)

FOREIGN PATENT DOCUMENTS

| | | | | |
|---|---|---|---|---|
| CN | 113406953 A | 9/2021 | | |
| EP | 3346347 A1 * | 7/2018 | ........... | B64C 39/024 |

*Primary Examiner* — Erin M Piateski
*Assistant Examiner* — David Mesquiti Ovalle

(57) ABSTRACT

A system and method for responding to objects encountered by autonomous machines at a worksite. Sensors at the worksite gather sensor data that may be used by one or more processors to identify an object or obstacle at the worksite and an associated location. The sensors may be disposed on an autonomous machine operating at the worksite. The system and method include determining, based on the sensor data, an object classification for the object and/or obstacle and determining, based on the object classification and the sensor data, a remediation procedure to remove the object from the path and enable the autonomous machine to complete the work plan. The system and method further include determining a second machine included in the remediation procedure from a set of machines located at the worksite and causing the second machine to perform the remediation procedure.

20 Claims, 5 Drawing Sheets

(56)                    References Cited

U.S. PATENT DOCUMENTS

| | | | |
|---|---|---|---|
| 11,230,273 B2 | 1/2022 | Whitfield, Jr. | |
| 2020/0148230 A1* | 5/2020 | Ehrmann | G06V 20/58 |
| 2020/0149248 A1 | 5/2020 | Ram-On et al. | |
| 2020/0332479 A1* | 10/2020 | O'Donnell | E01C 19/48 |
| 2021/0034058 A1* | 2/2021 | Subramanian | G06T 17/05 |
| 2022/0300001 A1* | 9/2022 | Gayaka | G10L 15/08 |
| 2023/0069475 A1* | 3/2023 | Porter | G05D 1/6484 |
| 2023/0094845 A1 | 3/2023 | Marsolek et al. | |

* cited by examiner

SYSTEM AND METHOD FOR RESPONDING TO OBSTACLES IN WORKSITES USING AUTONOMOUS MACHINES

TECHNICAL FIELD

The present disclosure relates to responding to obstacles encountered in a worksite using autonomous machines. More specifically, the present disclosure relates to responses to detected objects by autonomous machines within a worksite and methods for assigning resources based on the object detection to resolve the detected object and continue the work task.

BACKGROUND

Worksite machinery, such as earthmoving machines, haul trucks, cold planers, paving machines, compaction machines, and other equipment may be part of an autonomous worksite system. Such machines may operate in an autonomous or semi-autonomous manner to perform worksite tasks in response to commands generated as part of a work plan for the machine. The machine may receive instructions based on such a work plan to perform operations (e.g., cutting, digging, loosening, carrying, paving, compaction, etc.) at the worksite.

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite. However, it can be challenging to coordinate the activities of multiple machines at the worksite in a way that maximizes efficiency, particularly during situations in which one or more obstacles or other objects present at the worksite disrupt performance of worksite tasks.

An example system for performing tasks at a paving worksite is described in Chinese Patent No. 113406953 (hereinafter referred to as the '953 reference). In particular, the '953 reference describes an autonomous asphalt compactor that is capable of detecting obstacles that are located within a set perimeter around the machine. When the asphalt compactor detects an object located at the perimeter, the machine slows and stops, and waits for a predetermined time interval. After the predetermined time interval, the machine checks again for the object. If the object is still detected, the machine reverses to return to the starting location of a predetermined travel path, and moves to an adjacent lane so that the machine can continue compacting while avoiding the object.

Although the machine described in the '953 reference is configured to avoid contacting objects disposed within its travel path while performing a compaction operation, the system described in the '953 reference is not configured to coordinate removal of such objects, or otherwise remedy situations that may hinder or prohibit the performance of various worksite tasks. As a result, the system described in the '953 reference is not configured to maximize efficiency of the various processes being performed by the fleet of machines being utilized at the worksite in such situations.

Examples of the present disclosure are directed toward overcoming the deficiencies described above.

SUMMARY

One general aspect includes a method for responding to objects encountered by autonomous machines at a worksite.

The method includes receiving first information, by a first processor and via a network, determined by a sensor disposed at a worksite, the first information including a first timestamp, and an indication of an object disposed at a first location at the worksite, where the first location is in a path of an autonomous machine on a work plan at the worksite. The method further includes receiving, by the first processor, an object classification of the object. The method further includes providing, by the first processor and via the network, instructions to a second processor disposed at the worksite, where when executed by the second processor, the instructions cause the second processor to perform additional operations. The additional operations including to determine a remediation procedure to enable the autonomous machine to complete the work plan; determine a machine included in the remediation procedure from a set of machines located at the worksite, provide the remediation procedure to the machine, and receive confirmation of completion of the remediation procedure. Other embodiments of this aspect include corresponding computer systems, apparatus, and computer programs recorded on one or more computer storage devices, each configured to perform the actions of the methods.

One general aspect includes a system for responding to objects encountered by autonomous machines at a worksite. The system includes one or more processors, a sensor disposed at a worksite and in communication with the one or more processors, and a memory operably connected to the one or more processors and storing instructions that, when executed by the one or more processors, cause the one or more processors to perform various operations. The operations include to receive sensor data from the sensor, the sensor data including an indication of an object disposed at a location at the worksite, where the location is in a path of an autonomous machine on a work plan at the worksite, receive an object classification for the object, determine, based on the object classification and the sensor data, a remediation procedure to remove the object from the path and enable the autonomous machine to complete the work plan, determine a machine included in the remediation procedure from a set of machines located at the worksite, cause the machine to perform the remediation procedure, and receive confirmation of completion of the remediation procedure.

One general aspect includes one or more non-transitory computer-readable media having instructions stored thereon that, when executed, cause one or more processors to perform actions. The instructions cause the processors to perform operations that include receiving sensor data from a sensor positioned at a worksite, the sensor data including an indication of an object disposed at a location at the worksite, where the location is in a path of an autonomous machine on a work plan at the worksite, determining, based on the sensor data, tracking information for the object, receiving an object classification for the object; determining, based on the object classification and the sensor data, a remediation procedure to remove the object from the path and enable the autonomous machine to complete the work plan, determining a second machine included in the remediation procedure from a set of machines located at the worksite, causing the second machine to perform the remediation procedure, and receiving confirmation of completion of the remediation procedure.

DETAILED DESCRIPTION

Wherever possible, the same reference numbers will be used throughout the drawings to refer to the same or like parts.

Figure 1:
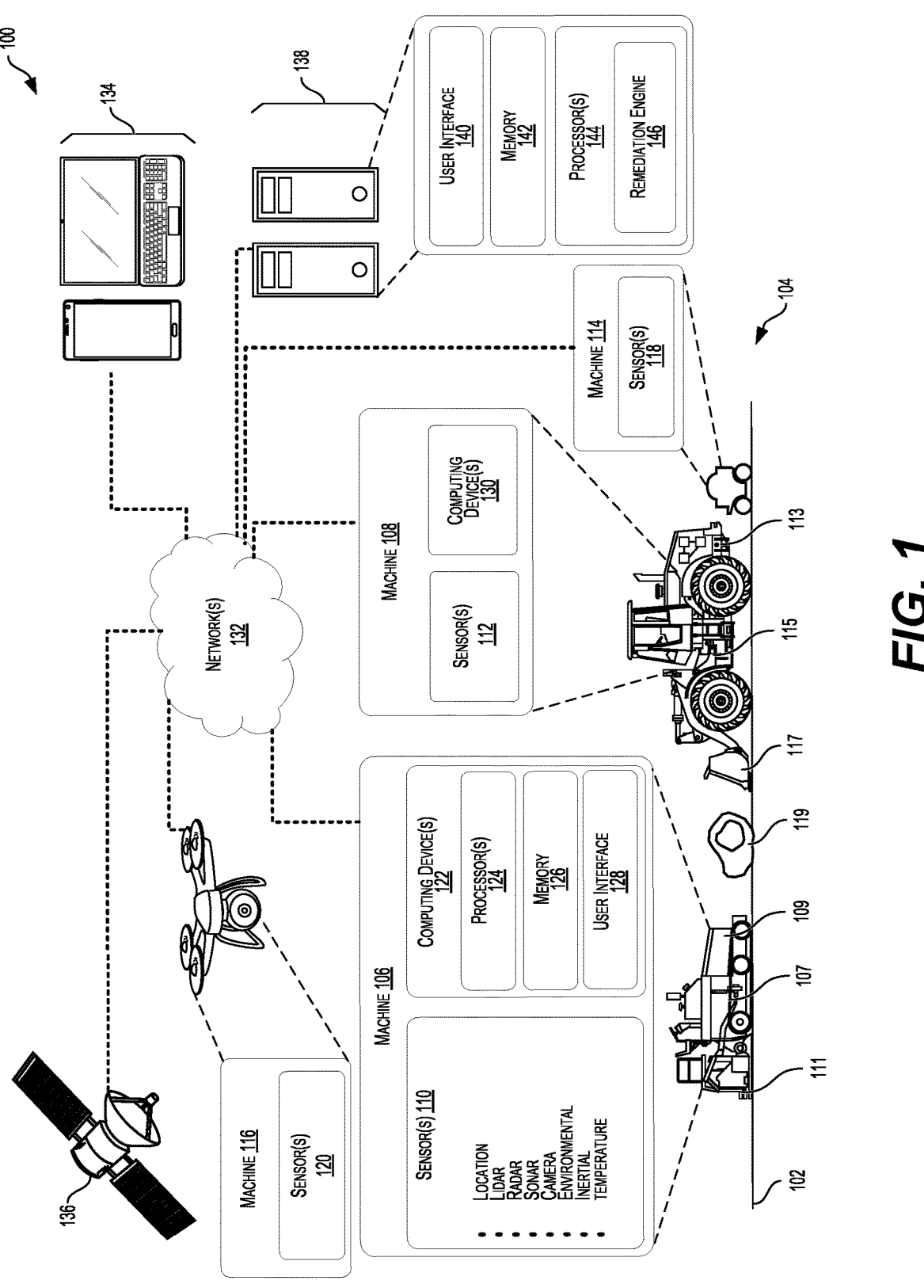
FIG. 1 illustrates an example system configured to respond to obstacles in worksites using autonomous machines, in accordance with examples of this disclosure.

FIG. 1 illustrates an example system 100 configured to respond to objects encountered at a worksite by an autonomous machine. The example system 100 may be used for detecting an object in the path of an autonomous machine and communicating an alert of the object (e.g., an obstacle) to a worksite controller (e.g., a computing platform) or to other machines or devices in order to determine a remediation procedure to deal with the object. The remediations may include assignment of a task to remove the obstacle. The example system 100 may be capable of classifying the object to automate and/or aid in determining what type of machine or remediation procedure is required. (e.g., a large boulder would have to be moved by a loader or dozer that is large enough to handle the payload or if the object is immovable such as a water puddle then a grader could be assigned to grade the area). In some examples, the object may not be automatically recognized, but additional tasks could be generated for personnel or other machinery (e.g., a drone) to evaluate the object and gather additional data for the determination. Though described herein with respect to an object, the example system 100 may be capable of removing objects (e.g., boulders) but also to clear and/or fill obstacles such as large puddles, holes, pools of water, uneven ground, and other such conditions at the worksite 104.

The example system 100 may also include one or more processors configured to make decisions regarding adjustments to a work plan based on the location of the object or obstacle, machines, personnel, and worksite material. In this manner, the autonomous machine that encounters the object may continue with the adjusted work plan without requiring a stop to the work plan to wait for the object to be dealt with, or to have to work around a machine brought in to handle the object. In some instances, the autonomous machine may continue a work plan if possible, while in other instances, the autonomous machine may slow or stop until the object is removed or remediated. Therefore, the example system 100 provides for real-time work plan adjustment and path planning that knows locations of other machines and personnel on the worksite and can cause the machines to work together in a manner that enables efficient completion of the work plan at the worksite.

As shown in FIG. 1, the example system 100 includes one or more machines disposed on and/or configured to perform one or more tasks on a work surface 102 of a worksite 104. For example, as illustrated in FIG. 1, the system 100 includes a first machine 106 disposed on the work surface 102. The first machine 106 is illustrated as a paving machine, but in additional examples, the first machine 106 may be a compaction machine, a haul truck, a dozer, an excavator, an articulated truck, a cold planar, a motor grader, a track loader, a wheel loader, or any other type of machine (e.g., paving equipment, mining equipment, construction equipment, etc.) configured to perform tasks at the worksite 104 or in other environments. The first machine 106 also includes a first frame 107, and a first prime mover 109 (e.g., an engine, one or more batteries, a fuel cell) supported by the first frame 107 and configured to provide power to machine components. The first machine 106 also includes one or more work tools or other first implement(s) 111 (e.g., screed, rotor, drum, bucket, etc.) operably connected to the first frame 107, movable relative to the first frame 107, and configured to perform one or more operations on the work surface 102. Such operations could be removing a portion of the work surface 102, depositing material (e.g., asphalt or other such paving material) onto the work surface 102, compacting the work surface 102 and/or material deposited on the work surface 102, moving gravel, sand, dirt, or other material located on the work surface 102 from a first location to a different second location, grading at least part of the work surface 102, etc. In some examples, the first machine 106 comprises a manned machine (e.g., operator manually controlling parameters and operation), but in other examples the first machine 106 comprises a semi-autonomous machine or a fully-autonomous machine.

In further examples, the system 100 includes a second machine 108. The second machine 108 can be the same and/or a different machine as/than the first machine 106. Similarly, the second machine 108 also includes a second frame 113, and a second prime mover 115 (e.g., an engine, one or more batteries, a fuel cell) supported by the second frame 113 and configured to provide power to machine components. The second machine 108 also includes one or more work tools or other second implement(s) 117 (e.g., screed, rotor, drum, bucket, etc.) operably connected to the second frame 113, movable relative to the second frame 113, and configured to perform one or more operations on the work surface 102. Such operations could be removing a portion of the work surface 102, removing an object 119, grading the work surface 102, filling a void in the work surface 102, depositing material (e.g., asphalt or other such paving material) onto the work surface 102, compacting the work surface and/or material deposited on the work surface 102, moving gravel, sand, dirt, or other material located on the work surface 102 from a first location to a different, second location, grading at least part of the work surface 102, etc. Additionally, although the second machine 108 is illustrated in FIG. 1 as a dozer, in other examples, the second machine 108 may be a haul truck, a paver, a compactor, an excavator, an articulated truck, a cold planar, a motor grader, a track loader, a wheel loader, or any other type of machine (e.g., paving equipment, mining equipment, construction equipment, etc.) configured to perform tasks at the worksite 104 or in other environments. Additionally, the second machine 108 can comprise a manned machine, a semi-autonomous machine, and/or a fully-autonomous machine.

As shown in FIG. 1, the first machine 106 is equipped with one or more first sensor(s) 110, and the second machine 108 may also be equipped with one or more second sensor(s)

112 (the use hereafter of the singular term "sensor" encompasses the use of plural sensors, unless it is clear from context that only a single sensor is contemplated). As illustrated schematically in FIG. 1, one or more of the first sensors 110 is connected to and/or otherwise carried by the first machine 106, and one or more of the first sensors 110 are configured to capture information in an environment surrounding the first machine 106. Such example first sensors 110 include LIDAR sensors, RADAR sensors, SONAR sensors, cameras (e.g., RGB, IR, intensity, depth, time of flight, etc.), audio sensors, ultrasonic transducers, location sensors (e.g., global positioning system (GPS), elevation sensors, etc.), inertial sensors (e.g., inertial measurement units, accelerometers, magnetometers, gyroscopes, etc.), environment sensors (e.g., temperature sensors, humidity sensors, light sensors, pressure sensors, etc.), and the like. As illustrated in FIG. 1, the one or more of second sensors 112 of the second machine 108 are configured to capture information in an environment surrounding the second machine 108. In such examples, the second sensors 112 include the same and/or different sensors as described above and included regarding the first sensors 110.

As shown in FIG. 1, the example system 100 may also include one or more ground-based mobile machines 114 (e.g., a rover) and/or one or more aerial machines 116 (e.g., a drone). The mobile machine 114 comprises any on-road or off-road vehicle configured to controllably traverse a portion of the work surface 102 of the worksite 104 ahead of and/or following the first machine 106 and/or the second machine 108. For example, the mobile machine 114 comprises an all-terrain vehicle, rover, or other like machine configured to make multiple passes along the work surface 102 and in accordance with a desired travel path. Additionally, the mobile machine 114 carries one or more third sensor(s) 118. The third sensors 118 can be the same as and/or different from the first sensors 110 of the first machine 106. The mobile machine 114 can traverse the worksite 104 prior to a machine operation conducted by the first machine 106. In further examples, the mobile machine 114 can traverse the worksite 104 following the machine operation conducted by the first machine 106. In some examples, the mobile machine 114 and/or the aerial machines 116 may follow the first machine 106 and/or the second machine 108 to confirm completion of tasks by the first machine 106 and/or the second machine 108. In such examples, the mobile machine 114 can, in close timing proximity, confirm and/or validate information collected by the first machine 106 and/or provide the information in lieu of any sensors disposed on the first machine 106. The aerial machine 116 comprises any airborne machine configured to controllably traverse a portion of the work surface 102 and/or the worksite 104. For example, the aerial machine 116 may comprise a drone, helicopter, plane, or other like machine configured to make multiple passes along the work surface 102 and/or worksite 104 and in accordance with a desired travel path. Additionally, the aerial machine 116 carries one or more fourth sensor(s) 120. The fourth sensors 120 can be the same as and/or different from the first sensors 110 of the first machine 106. In some further examples, the aerial machine 116 operates the same as and/or similarly to the mobile machine 114. The mobile machine 114 and/or the aerial machine 116 may be configured to monitor the worksite 104, and in some examples may monitor a projected path for the first machine 106 to identify objects 119 and/or obstacles lying within the path that would prevent the first machine 106 from completing its work plan.

As shown in FIG. 1, the first machine 106 further includes a first computing device 122. In such examples, the first computing device 122 further includes a first processor 124, a first memory 126, and a first user interface 128. The first processor 124 is an electronic controller that operates in a logical fashion to perform operations, execute control algorithms, store and retrieve data and other desired operations. The first processor 124 can include or access memory, secondary storage devices, processors, and any other components for running an application. The memory and secondary storage devices can be in the form of read-only memory (ROM) or random-access memory (RAM) or integrated circuitry that is accessible by the first processor 124. Various other circuits can be associated with the first processor 124 such as power supply circuitry, signal conditioning circuitry, driver circuitry, and other types of circuitry. The first user interface 128 can comprise an analog, digital, and/or touchscreen display, and such a control interface is configured to display, for example, at least part of the work plan for the first machine 106 and/or characteristics or data associated with the worksite, a travel path associated with the first machine 106, one or more alerts, requests, or other information provided to an operator of the first machine 106, boundaries, centerlines, or other information associated with a portion of the work surface 102 acted on by one or more other machines of the system 100, and/or other information. The first user interface 128 may also support other functions including, for example, sharing various operating data with one or more other machines of the system 100. In some examples, a display of the control interface is operable to display a worksite map that identifies at least part of a paving surface and/or progress of the first machine 106 on the work plan.

The first processor 124 may be a single processor or other device, or can include more than one controller or processor configured to control various functions and/or features of the system 100. As used herein, the term "processor" is meant in its broadest sense to include one or more controllers, processors, and/or microprocessors that are associated with the system 100, and that can cooperate in controlling various functions and operations of the components (e.g., machines) of the system 100. The functionality of the first processor 124 can be implemented in hardware and/or software without regard to the functionality. The first processor 124 relies on one or more data maps and/or sensor data relating to the operating conditions and the operating environment of the system 100 that can be stored in the first memory 126 of the first processor 124. Each of these data maps can include a collection of data in the form of tables, graphs, and/or equations to maximize the performance and efficiency of the system 100 and its operation.

The first computing device 122 is configured to facilitate interoperability between the components it contains, and to receive data sensed from the first sensor(s) 110. In some further examples, the first processor 124 is configured to operate pursuant to instructions stored in the first memory 126 and, in some cases, the first processor is configured to cause the first user interface 128 to display and/or otherwise provide information. In some examples, the second machine 108 includes a second computing device 130. In such examples, the second computing device 130 includes the same, similar, and/or different components than the first computing device 122 of the first machine 106. Furthermore, the second computing device 130 can operate in the same, similar, and/or different way as the first computing device 122 as described herein.

In the example shown in FIG. 1, the computing device 122 of the first machine 106 and the computing device 130 of the second machine 108 are in communication and/or otherwise connected with each other via a network 132. The network 132 can be a local area network ("LAN"), a larger network such as a wide area network ("WAN"), or a collection of networks, such as the Internet. Protocols for network communication, such as TCP/IP, can be used to implement the network 132. Although embodiments are described herein as using a network 132 such as the Internet, other distribution techniques can be implemented that transmit information via memory cards, flash memory, or other portable memory devices. The network 132 can implement or utilize any desired system or protocol including any of a plurality of communications standards. The desired protocols will permit communication between the first processor 124, the additional computing device(s) 134, a second processor 144, the various machines described herein, and/or any other desired machines or components of the system 100. Examples of wireless communications systems or protocols that can be used by the system 100 described herein include a wireless personal area network such as Bluetooth™. (e.g., IEEE 802.15), a local area network such as IEEE 802.11b or 802.11g, a cellular network, or any other system or protocol for data transfer. Other wireless communication systems and configurations are contemplated. In some instances, wireless communications can be transmitted and received directly between the components of the system 100 (e.g., between machines). In other instances, the communications can be automatically routed without the need for re-transmission by remote personnel.

In further examples, computing devices of two or more of the first machine 106, the second machine 108, the mobile machine 114, and/or the aerial machine 116 are in communication and/or otherwise connected with each other via the network 132. In some further examples, the network 132 further connects one or more of an additional computing device(s) 134 and/or one or more of a satellite(s) 136. Thus, as described herein, the network 132 is configured to facilitate communication between any one or more machines disposed at and/or remote from the worksite 104, computing platforms at and/or remote from the worksite 104, other worksites and/or material processing and/or holding plants, and the like. The additional computing device(s) 134 can also comprise components of the system 100. Such additional computing device(s) 134 can comprise, for example, mobile phones, laptop computers, desktop computers, and/or tablets of project managers (e.g., foremen) overseeing daily paving operations at the worksite and/or at the paving material plant. Such additional computing device(s) 134 can include and/or be configured to access one or more processors, microprocessors, memory, or other components. In such examples, the additional computing device(s) 134 have components and/or functionality that is similar to and/or the same as the first processor 124.

As shown in FIG. 1, the example system 100 also includes a computing platform 138 in communication and/or otherwise connected to the network 132. In such examples, the computing platform 138 includes a second user interface 140 and a second memory 142. The second user interface 140 provides a centralized location (i.e., back office) an ability to perform actions (i.e., manually, semi-autonomously, and/or fully autonomously) including data input, determination of object classification (e.g., object type, object identity, etc.), determination of remediation procedures, and determination of machines to alert and/or instruct to perform the remediation. The second memory 142 can store computer readable media, machine learning algorithmic instructions, compiled sensor data, work plan data for the machines, worksite data, and the like. In some further examples, the computing platform 138 includes the second processor 144 which includes a remediation engine 146. The remediation engine 146 may comprise a software component of and/or associated with the second processor 144 (e.g., an executable software component stored in the second memory 142) or a hardware component of the second processor 144 (e.g., a remediation engine or module configured to perform one or more determinations and/or calculations as part of determining how to clear a path for the first machine 106 based on information received by the computing platform 138). In some examples, the second processor 144 performs tasks provided by stored instructions in the second memory 142 including, but not limited to, initiating the remediation engine 146 which determines a remediation procedure for an object 119 or obstacle at the worksite 104 based at least in part on the received information, via the network 132, from one or more sensors disposed on one or more machines.

Based on sensor data from the first machine 106, the object 119 may be identified as resting within a projected path of the first machine 106 as part of its work plan. The data from the first sensor 110 may be used to determine the location of the object 119. The determination of the location and/or an object classification determination may be performed on-board the machine 106, for example using the computing device 122. When the first machine 106 detects the object 119 (and/or an obstacle), the first machine 106 may determine, based on sensor data from a first time and a second time, whether the object 119 is stationary or non-stationary. For example, the sensor data from the first time and the second time may remain unchanged and/or indicate that the position of the object is unchanged and therefore the first machine 106 may determine the object 119 is stationary. The computing device 122 may generate tracking information for the object 119 based on the data from the first sensor 110 that may be used for determining whether the object 119 is stationary or non-stationary. In the event that the computing device 122 determines that the object 119 is non-stationary, the computing device 122 may use the tracking information to determine if the object 119 (e.g., another machine) will still be in the path of the first machine 106 by the time the first machine 106 reaches a current or predicted location of the object 119. In the event that the object 119 is determined to be stationary, the computing device 122 may convey information related to the object 119 to the computing platform 138 such that the computing platform 138 may generate a plan, using the remediation engine 146, to remove the object 119 from the path of the first machine 106.

In some examples, the computing device 122 may use the first sensor 110 to identify the object 119 and/or determine a classification for the object to determine an object type (e.g., a category, a specific identity, etc.). For instance, the computing device may use one or more machine learning algorithms trained for object detection and identification to classify the object 119 and/or obstacle. The one or more machine learning algorithms may be trained using training examples. The training examples may include example inputs of sensor data from a variety of sensors as well as desired outputs associated with the inputs, the desired outputs identifying the objects, obstacles, or type of object. Training the machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison.

The classification or identification may include identifying a class of object (boulder, loose material such as dirt, packed material, etc.) and may also include a specific identification (identification of the type or identity of the object such as a particular machine, person, etc.). The identification may, in some examples, include unique identification. The unique identification may be based on the object. In an illustrative example, a machine detected by the computing device 122 may be uniquely identified based on a visible identifier or marker (e.g., serial number, visible alphanumeric code, serial number, QR code, or other such visible identifier). The unique identification may also be based on additional sensor data such as wireless communication between the first machine 106 and the object (assuming the object is a machine capable of wireless communication).

In some examples, the first machine 106 may identify a presence of the object 119 and a location of the object 119 but may not be able to identify the object 119. Accordingly, the computing device 122 may convey an instruction over the network 132 to the computing platform 138 and/or one or more additional devices such as the mobile machine 114, aerial machine 116, and/or additional computing devices 134 requesting additional information related to the object 119. The computing platform 138 may cause one or more devices to gather additional data regarding the object and/or convey an alert for personnel to inspect the object 119.

In response to detecting the object 119, the first machine 106 may decrease the speed at which it is traveling towards the object 119, which may include stopping to wait for the object 119 to move or be removed. The first machine 106 may resume full speed or return to operation when the object 119 is out of the path for the first machine 106. The first machine 106 may, in some examples, perform such reduction of speed when the object 119 is determined to be a moving object such as a machine that will clear the path within a predetermined time window. If the object 119 does not move within a predetermined time window, is determined to be stationary, or identified as an object classification that is not capable of self-propulsion, the computing device 122 may alert the computing platform 138 to cause the computing platform 138 to generate a remediation procedure.

After alerting the computing platform 138, the computing device 122 and/or the computing platform 138 may determine an adjusted work plan for the first machine 106. The adjusted work plan may include slowing, stopping, or changing a future path of the first machine to proceed to a different part of the work plan to avoid the object 119 until the remediation plan is complete. For example, a compaction machine may move on, in the adjusted work plan, to a next compaction lane and then return to the incomplete area where the object 119 is located after the object is removed or dealt with. In some examples, the skipped portion of the work plan is recorded such that the adjusted work plan and/or computing platform 138 can ensure that after the object 119 is handled then the region is treated by the first machine 106 or another machine capable of performing the task.

The computing device 122 may alert the computing platform 138 of the object 119 and may convey sensor data from the first sensor 110 to the computing platform. The computing platform 138 may also receive sensor data from other machines related to the object and/or location at or around the object. The computing platform 138 may then, using the remediation engine 146, determine a remediation procedure for handling the object 119 such that the first machine 106 may complete the work plan. In some examples, the object recognition described above may be performed by the computing platform 138 using one or more machine learning models. The remediation engine 146 may determine a task to handle the object 119 based on the object recognition. The task may involve one or more other machines, such as second machine 108, and/or personnel. For example, if a large boulder is detected then the remediation engine may determine, based on characteristics of the object 119 (e.g., size, estimated weight, etc. that may be estimated from the sensor data) a machine capable of moving the large boulder. Other types of objects or obstacles may have other machines that may be required, such as graders, loaders, dozers, rotary mixers, or other machines. In some examples, the machine to be assigned to the task may be predefined based on a set of rules defining what tasks the different machines may be able to perform. The computing platform 138 may determine the machine to perform the task based on available machines and/or machine scheduling. For example, if a machine is located at the worksite, currently not on a job, about to complete a work plan, or other availability data.

The computing platform 138 may determine the adjusted work plan based on the location of the machine assigned to the remediation task and/or based on locations of other machines or personnel. In this manner, the computing platform 138 may coordinate the remediation plan to remove the object 119 from the path of the first machine 106 without also interrupting any other work plans for other machines. Because the computing platform 138 has real-time data related to the locations, progress, and status of all the machines and personnel on the worksite, the computing platform 138 reassigns the first machine 106 to the adjusted work plan based on a path that the second machine 108 will have to traverse to reach the object 119 as part of the remediation plan. In this manner, the computing platform 138 uses route planning systems and tools to ensure that the machines will not interfere with each other while the remediation plan is performed.

The remediation engine 146 may determine the remediation plan for the object 119 as well as the adjusted work plan for the first machine 106. In some examples, the remediation plan may include instructing an autonomous or semi-autonomous machine according to the remediation plan to remove or resolve the object 119. In some examples, the remediation plan may include alerting personnel to remove or address the object, using manual devices and machines or with other systems at the worksite. The computing platform 138 may track the completion of the work plan by the first machine 106 and may record that the area around the object 119 is skipped until remediation is complete. The information from tracking the completion may be stored as a map that includes elevation, coverage, compaction, or other task-related information. The computing platform 138 may receive confirmation of completion of the remediation and then may adjust the work plan for the first machine 106 such that the first machine 106 completes the task in the area of the object 119. The confirmation may be received from the second machine 108 and/or from other machines such as the mobile machine 114 and/or the aerial machine 116. In some examples, after the second machine 108 indicates that the remediation is complete, the computing platform 138 may cause one or more other machines to gather sensor data to confirm the completion.

In creating this second adjusted work plan, the computing platform 138 may use the current location and status of the first machine 106 to inform when the first machine 106 will return to the area skipped around the object. In some examples, the computing platform 138 may determine that a different machine capable of performing the task should complete the task in the region at the location of the object, for example if the first machine 106 has moved on to a different work plan or is far removed from the area while another machine may be available and closer to the location, and therefore able and available to complete the task.

In example embodiments, the first machine 106, the second machine 108, the mobile machine 114, the aerial machine 116, and/or other such device, are in communication with the one or more GPS satellite 136 and/or UTS and/or global navigation satellite system (GNSS) to determine a respective location of the respective machine to which any one of the location sensors associated with the respective machines is connected continuously, substantially continuously, or at various time intervals. One or more additional machines of the system 100 can also be in communication with the one or more GPS satellite 136 and/or UTS, and such GPS satellite 136 and/or UTS are also configured to determine respective locations of such additional machines. In any of the examples described herein, machine locations determined by the respective location of the respective machines are used by the computing platform 138, the first computing device 122, the second computing device 130, and/or other components of the system 100 to coordinate activities of any of the respective machines and/or other components of the system 100. In some other instances, the respective locations of the machines can include metadata (e.g., time) for use by the remediation engine 146 in determining remediation plans, identifying machine locations, identifying objects and object locations, and instructing the machines involved in the remediation plan.

In some examples, the remediation engine 146 includes or has access to one or more machine learned models (e.g., data models) configured to determine the remediation plan for the object 119. As part of determining the remediation plan, one or more machine learning models may be used for object detection characteristic estimation, object classification, or other tasks described herein. Machine learning may take empirical data as input, such as data from the sensors of the machines as well as object data and machine location. Machine learning systems may take advantage of data to capture characteristics of interest that have an unknown underlying probability distribution or weighting. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which performance characteristics are preserved during a localization process and validate localized content when the performance characteristics are preserved.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, Fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

In some examples, the machine learning models may include access to or versions of multiple different machine learning models that may be implemented and/or trained according to the techniques described herein. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The example system 100 of FIG. 1, as described herein provides for detecting an object and/or obstacle in the path of an autonomous machine at a worksite 104 and communicating an alert of the object (e.g., an obstacle) to a computing platform 138 acting as a worksite controller and/or or to other machines or devices in order to determine a remediation procedure to deal with the object. The remediations may include identification of the object and/or obstacle and determination of a task to remove the obstacle. The example system 100 may be capable of classifying the object through sensors of the autonomous machines and the computing platform 138 to automate and/or aid in determining what type of machine or remediation procedure is required. (e.g., a large boulder would have to be moved by a loader or dozer that is large enough to handle the payload or if the object is immovable such as a water puddle, then a grader could be assigned to grade the area). In some examples, the object may not be automatically recognized, but additional tasks could be generated for personnel or other machinery (e.g., a drone) to evaluate the object and gather additional data for the determination. The computing platform 138 may then instruct one or more machines, such as the second machine 108, to perform a remediation procedure. The computing platform 138 may also instruct and/or change instructions to the first machine 106 to continue progress at the worksite 102 while the object is removed.

Figure 2:
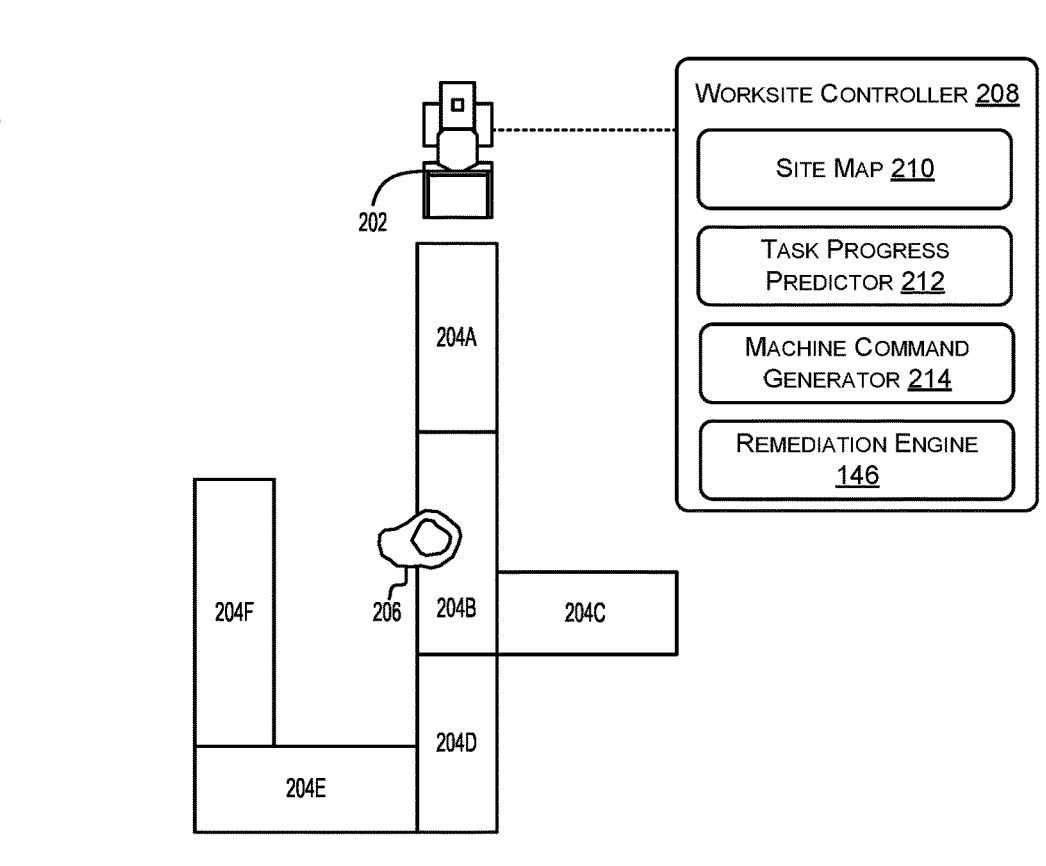
FIG. 2 illustrates an example work plan for a machine that encounters an object in the path of the work plan, in accordance with examples of this disclosure.

FIG. 2 illustrates an example worksite 200 with a work plan for a machine 202 that encounters an object 206 in the path of the work plan. The machine 202 may be an example of the first machine 106 of FIG. 1. A worksite controller 208 can be configured to control the machine 202 as well as other machines to enter a low-power state, to wake from a low-power state, perform a task, follow a work plan, or other actions that may be controlled by the worksite controller 208 to coordinate action. The worksite controller 208 may be an example of the computing platform 138 of FIG. 1.

Figure 7:
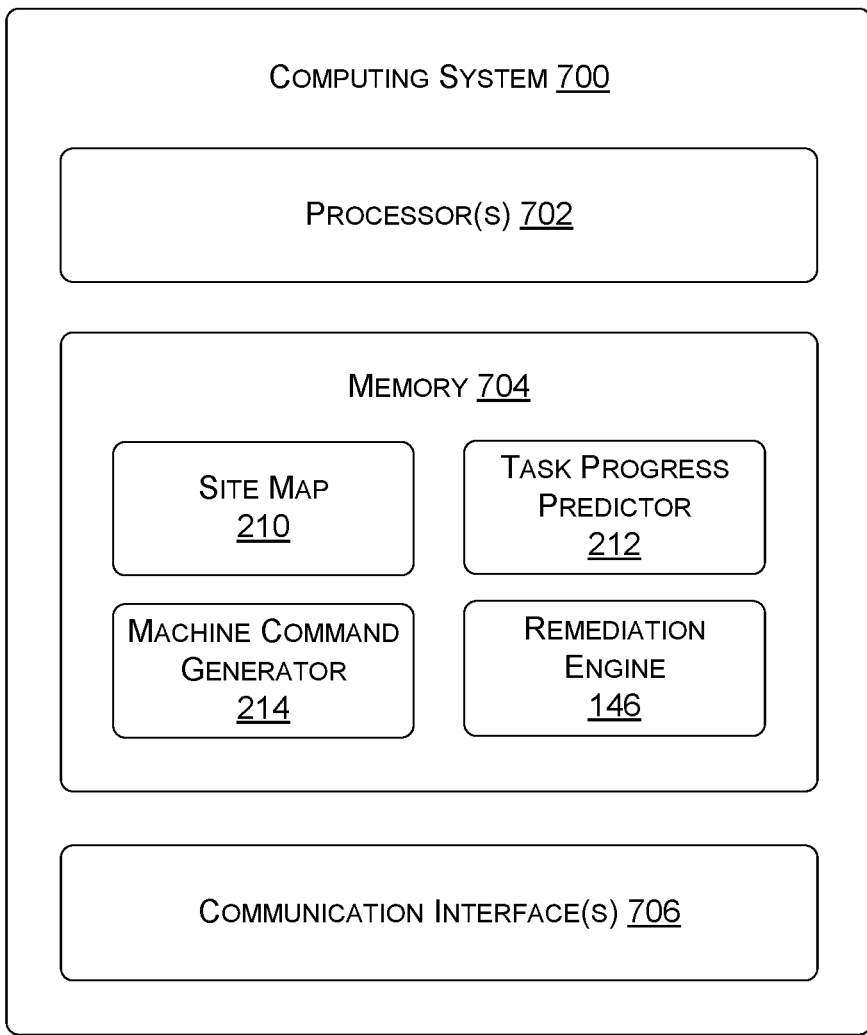
FIG. 7 illustrates an example system architecture for a computing system associated with the worksite controller.

The worksite controller 208 can be one or more servers, computers, or other off-board computing devices that are separate from the machine 202. For example, while the machine 202 can be located at the worksite 200, the worksite controller 208 can be located at a back office or other location that is remote from machine 202 and at the worksite 200, or that is remote from the worksite 200 overall. The worksite controller 208 can be configured to track machines at the worksite 200, assign machines to perform tasks at the worksite 200, transmit instructions and/or commands to machines at the worksite 200, and/or to perform fleet management operations and other operations discussed herein. FIG. 7, discussed further below, describes an example system architecture for a computing system associated with the worksite controller 208.

The worksite controller 208 can have a site map 210 (e.g., a locally stored map in memory and/or access to a map stored in a memory) associated with the worksite 200. The site map 210 can indicate locations of work areas 204 (including work areas 204A, 204B, 204C, 204D, 204E, and 204F, sometimes referred to as the work plan) at the worksite 200, boundaries of the worksite 200, terrain of the worksite 200, locations and/or identities of machines at the worksite 200, locations of a parking area at the worksite 200, locations and/or identities of objects 206 or obstacles at the worksite 200, and/or other information associated with the worksite 200. For example, the site map 210 can indicate locations of refueling stations, battery recharging stations, vehicles, personnel, lakes, ponds, rivers, cliff faces, hills, roads, intersections, and/or other types of areas, objects, terrain features, or obstacles.

As noted above, the site map 210 can indicate work areas 204 at the worksite 200 where machines, such as the machine 202, are to perform tasks. For example, the site map 210 can indicate locations and/or boundaries of individual work areas 204 at the worksite 200, such as work areas 204 where tasks are to be performed during a particular workday or other period of time. FIG. 2 shows an example in which the work areas 204 include work areas 204A-204F, however the site map 210 may indicate fewer work areas 204, more work areas 204, different locations and/or configurations of work areas 204, and/or a set of work areas 204 with any other differing attributes.

The site map 210 can also include, or be associated with, design information indicating a desired state of the worksite 200 and/or individual work areas 204. For example, the design information can indicate defined elevations that the work surface of the worksite 200 should be graded to, by grading machines, at one or more work areas 204. In some examples, the worksite controller 208 can have a user interface that allows a user to define one or more work areas 204 at the worksite 200, provide design information associated with the work areas 204, define tasks to be performed by machines at the work areas 204, and/or other information.

In some examples, the worksite controller 208 can update the site map 210 over time based on machine progress data received from the machine 202 and/or other machine progress data received from other machines. For instance, the worksite controller 208 can use progress data received from machines to update the site map 210 to track current locations of machines, and/or to update a model of the current state of the work surface of the worksite based on tasks that machines have completed.

The worksite controller 208 can also have a task progress predictor 212 that can use progress data, such as the machine progress received from machines to predict, project, or estimate when individual machines will complete particular tasks, and/or will complete portions of particular tasks. In some examples, the progress data received from a machine may include an estimated task completion percentage and/or estimated task completion time determined by an on-board computing system of the machine 202. In these examples, the task progress predictor 212 can use such estimates determined on-board the machines as predicted task completion times. However, in other examples, the progress data received from a machine may include other types of data that the task progress predictor 212 can use to predict an estimated time of completion for a particular task.

In an example, the task progress predictor 212 can compare work surface elevations directly or indirectly indicated in multiple instances of machine progress data received from a grading machine over time, and/or relative to a target work surface elevation indicated in a design file, to project how much longer the overall grading task is projected to take. For example, the task progress predictor 212 can determine a change between a first work surface elevation (indicated at a first time by a first instance of the machine progress data) and a second work surface elevation (indicated at a second time by a second instance of the machine progress data) and determine a progress rate based on the change in the work surface elevations between the first time and the second time. The task progress predictor 212 can then project a task completion time for the overall grading task, based on the progress rate and a depth of material still be graded between the second work surface elevation and a target work surface elevation.

Although the task progress predictor 212 can determine or predict a task completion time for an overall task as described above, in some examples the task progress predictor 212 can also, or alternately, predict times at which machines will complete portions of task. For example, the machine progress data provided by the machine 202 may indicate that the machine 202 will be finished working on a task at a first portion of work area 204A at a first time, and will be finished working on the task at a second portion of work area 204B at a second time.

The task progress predictor 212 can also be configured to predict travel times of machines to locations at the worksite 200, based on current locations of the machines, available routes indicated by the site map 210, terrain conditions indicated by the site map 210, historical average speeds of individual machines, and/or other data. The task progress predictor 212 can also be configured to predict machine wake-up times, such as the time it may take a second machine to wake to an active state from a low-power state in response to a wake-up command from the worksite controller 208, for instance based on historical wake-up times for the same machine or similar machines.

In some examples, the task progress predictor 212 can be configured to predict task progress data, durations of machine operations, and/or other data based on physics-based simulations of machines, the work areas 204, and/or the worksite 200 overall. In other examples, the task progress predictor 212 can include or be based on at least one machine learning model that is configured to predict task progress data, durations of machine operations, and/or other data. For example, the task progress predictor 212 can be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

A machine learning model associated with the task progress predictor 212 can be trained using a supervised or unsupervised machine learning approach, for instance based on a training data set. For example, the training data set can include sample progress data, similar to the machine progress data reported by similar machines during operations of similar tasks, and corresponding data indicating when those machines finished the tasks. The machine learning model can learn to identify which factors in the sample progress data are predictive of the task completion times indicated in the training data set. Accordingly, after training the machine learning model to identify such factors and/or weights associated with the factors, the task progress predictor 212 can, for example, use information associated with those factors in the machine progress data received from the machine 202 to predict when the machine 202 is likely to complete an instance of a first task.

In some examples, the task progress predictor 212 can be associated with multiple machines learning models, such as different types of machine learning models machine learning models that have been trained on different training data sets, or machine learning models that have been trained to make predictions for different types of use cases or types of machines. Accordingly, the task progress predictor 212 may select a particular machine learning model to use to predict when the machine 202 is likely to complete an instance of a first task, based on a type of machine 202, information in the site map 210, information in the machine progress data, and/or other information that indicates a particular use case or scenario associated with the particular machine learning model.

A machine command generator 214 of the worksite controller 208 can be configured to generate and transmit command data to machines at the worksite 200. The command data sent to a particular machine can assign the machine to perform tasks at one or more work areas 204, instruct the machine to travel to certain work areas 204 autonomously or along specified routes determined by the worksite controller 208, instruct the machine to travel to the parking area at the worksite 200, and/or otherwise include instructions that the on-board computing systems of the machine 202 can follow. In some examples, the machine command generator 214 can generate and send machine commands that include wake-up commands or shut-down commands, based on predicted task completion times predicted by the task progress predictor 212.

As an example, the machine command generator 214 can determine, based on the site map 210, that a task is to be performed at work area 204A at the worksite 200. The machine command generator 214 can accordingly cause the worksite controller 208 to send machine command data that instructs the machine 202 to perform an instance of the task at work area 204A. In response to the machine command data, the on-board computing device of the machine 202 can cause the machine 202 to travel to work area 204A and begin performing the task. The on-board computing device of the machine 202 can also periodically or occasionally send machine progress data to the worksite controller 208. Accordingly, the task progress predictor 212 can use physics simulations, machine learning models, historical data, and/or other operations or data to predict a time at which the machine 202 will complete the first task at work area 204A.

Remediation engine 146 may also be included at the worksite controller 208, and may perform one or more tasks for remediation of an object 206 or other obstacle as described with respect to FIG. 1. For example, when the machine 202 is working on the work area 204A, the sensors of the machine 202 may detect the object 206. The object may include a physical object, obstruction, or other impediment to completing the work plan. The on-board computing device of the machine 202 may identify the object 206 and the location and may convey the sensor data, identification, and location data to the worksite controller 208. The remediation engine 146 may determine, as described herein, the identity of the object 206 as well as one or more machines that may be used to address the object 206, for example to move a boulder. The worksite controller 208 may further identify, based on machine availability and locations at the worksite, a machine to instruct to remove the object 206. After the worksite controller 208 makes the identifications and/or determinations described above, the worksite controller 208 may instruct a second machine 302 to begin a remediation task, such as described with respect to FIG. 3.

Figure 3:
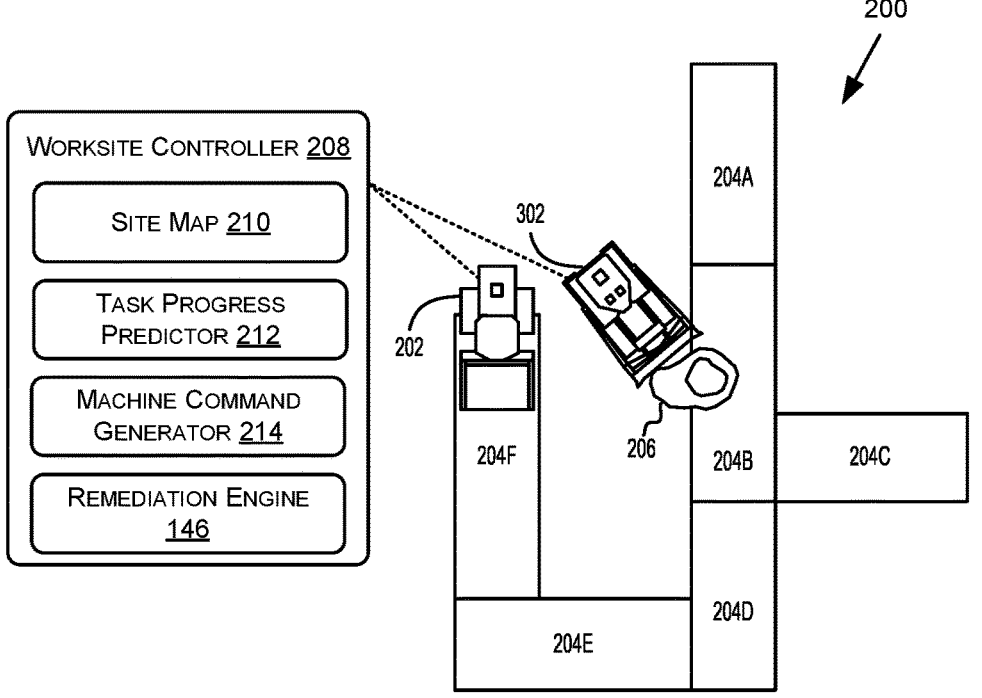
FIG. 3 illustrates an example of the work plan showing a second machine instructed to remove the object from the path, in accordance with examples of this disclosure.
Figures 4, 5:
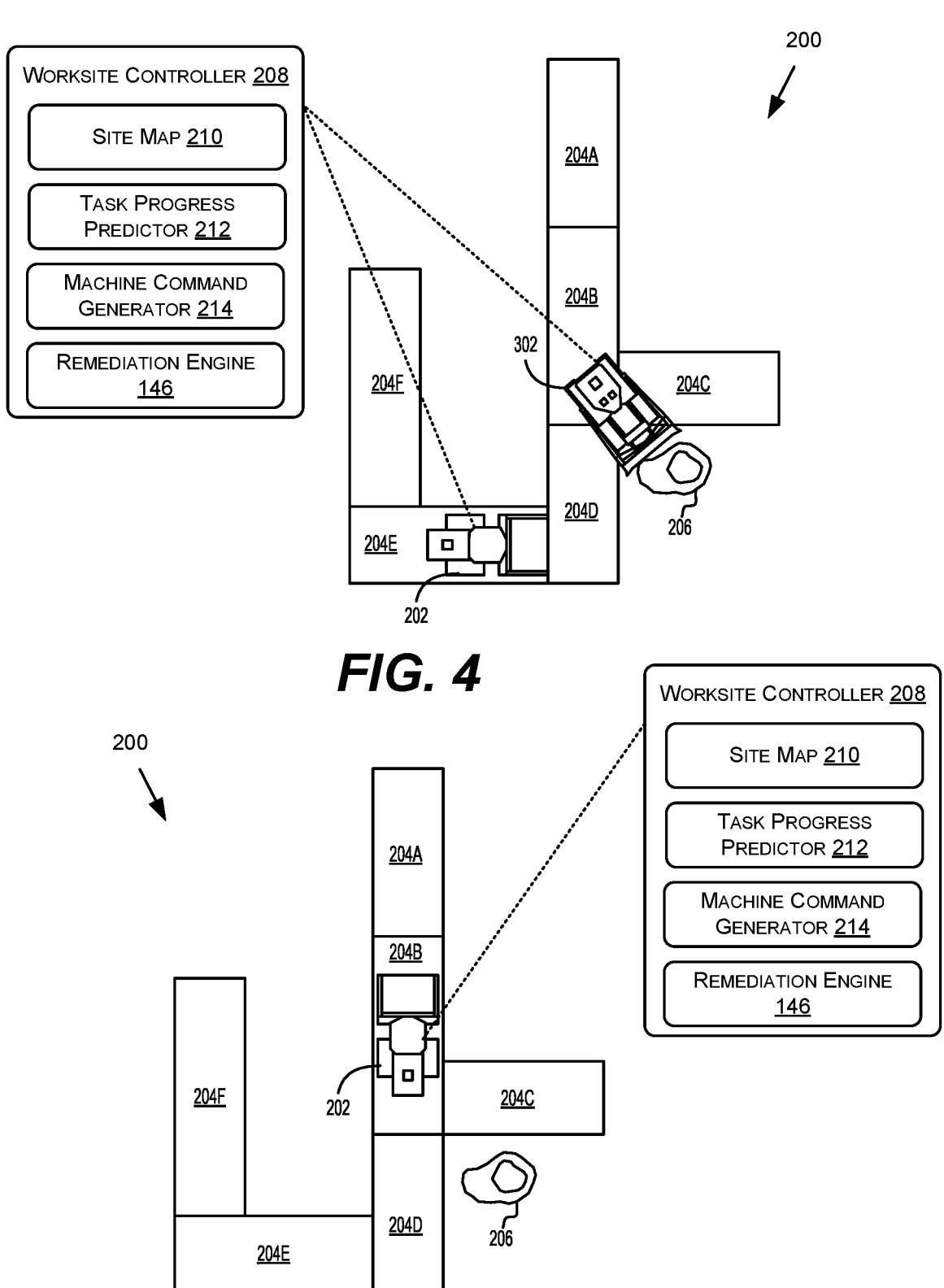
FIG. 4 illustrates an example of the work plan showing a second machine removing the object from the path, in accordance with examples of this disclosure.
FIG. 5 illustrates an example of the work plan showing the machine proceeding with the work plan during and after removal of the object, in accordance with examples of this disclosure.

FIG. 3 illustrates the example worksite 200 with the work plan for a machine 202 that encounters an object 206 in the path of the work plan while a second machine 302 is removing the object 206. After the remediation engine 146 determines the second machine 302 is available, the remediation engine 146 may instruct the second machine 302 to proceed to the work area and remove the object 206 to a particular location. The object 206 may be moved to a location where the worksite controller 208 identifies it may not obstruct other work plans (it is envisioned that the object 206 may be moved multiple times over the course of multiple work plans). In addition to instructing the second machine 302, the worksite controller 208 may cause the machine 202 to proceed from the work area 204A to a different work area, such as work area 204F after completing work area 204A. In some examples, the machine 202 may proceed from work area 204A to work area 204C as it is the next nearest work area adjacent work area 204A. However, as illustrated in FIGS. 3-4, the second machine 302 may operate in work areas 204B, 204C, and 204D to remove the object 206. Accordingly, the machine 202 may proceed to work area 204F to continue the work plan.

In this manner, the machine 202 may continue with the work plan while the second machine 302 clears the object 206. The machine 202 may be sent to a work area that is away from the location of the object 206, away from the path of the second machine 302, and also away from the location where the object 206 will be deposited. In this manner, the machine 202 may continue with the work plan nearly uninterrupted while the object 206 is removed.

FIG. 4 illustrates the example worksite 200 with the work plan for the machine 202 as the second machine clears the object 206. As illustrated, the machine 202 proceeds with the adjusted work plan, after completing work area 204F it may proceed to 204E, as that area is adjacent and also clear of the remediation task working area for the second machine 302. The second machine 302 meanwhile, moves the object 206 clear of the work plan, and clear of other work areas as determined by the worksite controller 208. The machine 202 may then proceed with work areas 204D and 204B, as illustrated in FIG. 5, which was originally obstructed by the object 206.

Figure 6:
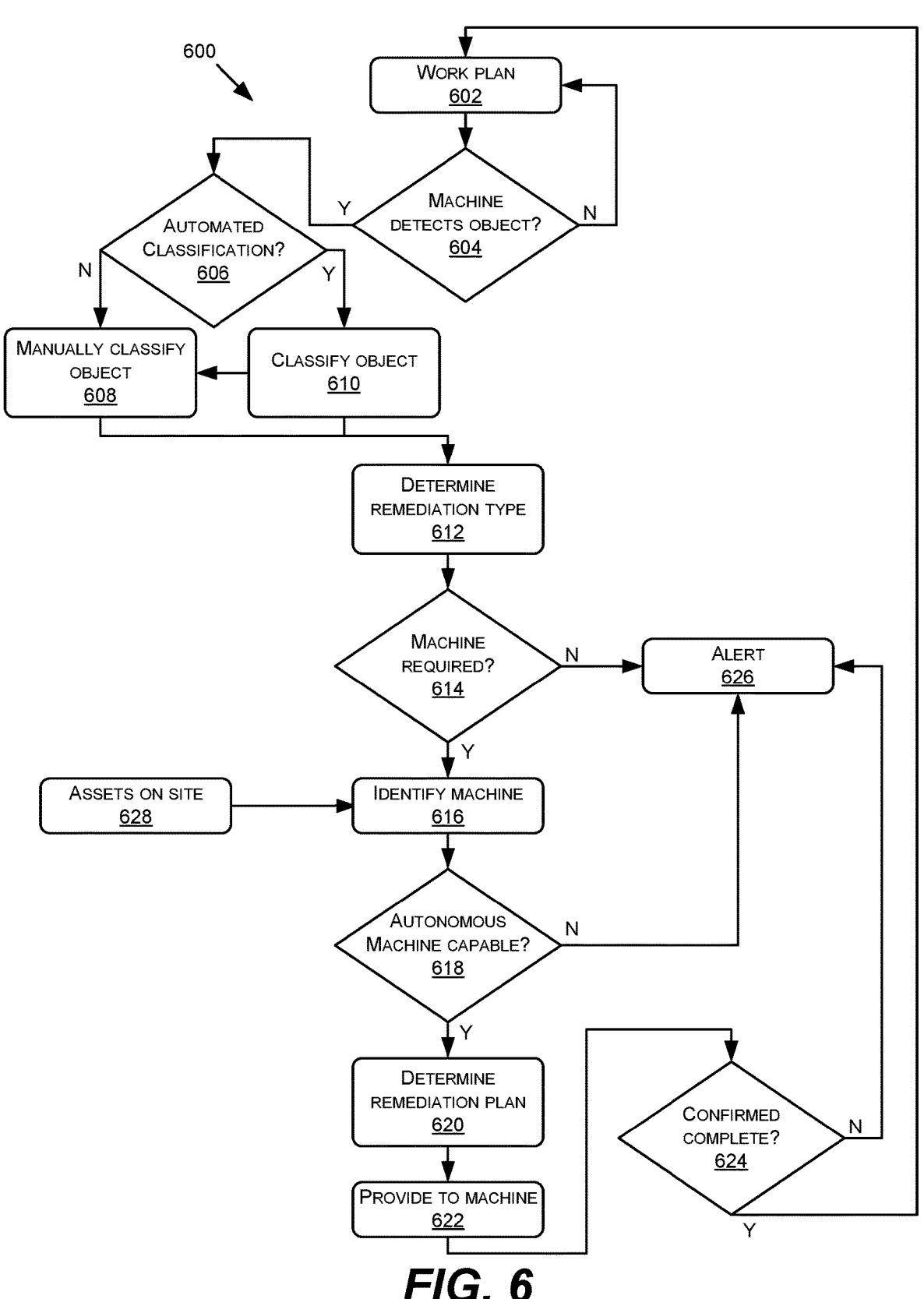
FIG. 6 illustrates a flow chart depicting a method of responding to an object at a worksite using autonomous machines in accordance with an example embodiment of the present disclosure.

FIG. 6 illustrates a flow chart depicting a method of responding to an object at a worksite using autonomous machines in accordance with an example embodiment of the present disclosure. The example method 600 is illustrated as a collection of steps in a logical flow diagram, which represents operations that can be implemented in hardware, software, or a combination thereof. In the context of software, the steps represent computer-executable instructions stored in memory. When such instructions are executed by, for example, the computing platform 138, such instructions cause the first machine 106, the second machine 108, and/or the additional computing devices 122, generally, to receive instructions corresponding to producing at least a portion of the multi-layer material property map. Such computer-executable instructions can include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the example method 600 is described with reference to the first machine 106 and the computing platform 138 of FIG. 1.

At 602, the example method 600 includes the first machine 106 performing a work plan at a worksite. The computing platform 138 may have a copy of and may maintain and/or adjust a work plan for the worksite. The computing platform 138 may send individual instructions to machines, such as the first machine 106 for particular tasks at the worksite 102. A computing device 122 of the first machine 106 may then cause the first machine 106 to proceed with the work plan as instructed.

At 604, the example method 600 includes the first machine 106 detecting, using first sensor 110 and the computing device 122, an object in the path of the first machine 106. The first sensor 110 of the first machine 106 may detect an obstacle, object, personnel, and/or machinery. In some examples, the first machine 106 may detect the object or obstacle but determine that the object is not in a projected path or work area for the first machine 106 as it follows the work plan. Accordingly, the computing device of the first machine 106 may determine that the object is irrelevant as it lies outside of the predicted path and work area for the first machine 106. In the event that no object is detected at 604, the first machine 106 proceeds according to the work plan from the computing platform 138 until an object is detected.

At 606, the computing device of the first machine 106 may classify the object and determine the location of the object. Specifically, at 606, the computing device may determine if automated classification is available for the object. The automated classification may be based on object identification, determining whether the object is stationary or non-stationary, or determining one or more classifications for the object. The object may be tracked, to determine if the object is stationary or non-stationary. In some examples, the computing device may determine a type or classification of the object and/or an identity of the object (e.g., machine identity). The computing device may track the object to determine if it is moving and/or may identify the object to determine if it is capable of moving without being moved by another machine. For example, personnel or other machines may be identified as capable of self-propulsion.

If automated classification is not available, then the object may be manually classified at 608. The manual classification may include conveying an alert to an operator or other computing device at the worksite or other location requesting input regarding the classification of the object. If automated classification is available, then the classification of the object, according to one or more types of classification, such as those described above, may be performed at 610 by the computing device and/or another computing device at the worksite or in communication with the computing device. In the event that automated classification at 610 fails, then the object may be classified at 608 manually.

After the computing device identifies and tracks the object, the computing device may convey the data relating to the object to a second computing device, such as the computing platform 138. In some examples, the computing device of the first machine 106 may perform some or all of the following steps described with respect to the computing platform 138.

At 612, the computing platform 138 receives the data from the first machine 106 and determines a remediation type using the remediation engine 146. The remediation type may include identification of the type of object or obstacle, identification of how to resolve the object (e.g., fill, remove, instruct to move, etc.), and identification of a type of machine capable of performing the required task. For example, a particular size dozer may be required to move a boulder, a grader to fill in a hole, a computing device to instruct an autonomous machine to move, or a computing device to alert personnel. The computing platform 138 may determine the type of machine to use based on available assets on site or accessible by the computing platform 138, as provided at 628. In some examples, the computing platform may determine that remediation is not possible, for example if an object or obstacle is too large or immovable. In such cases, the computing platform 138 may alert an operator of the object or obstacle and the determination that remediation may not be possible.

At 614, the computing platform 138 may determine, based on the type of remediation, whether a machine or other device is needed. If no machinery or device is needed, for example due to size (e.g., a small board) or availability or due to the fact that the object has been classified as personnel, then the computing platform 138 may alert an operator or other personnel at 626 of the object and instruct removal of the object. If a machine is required for the removal, as determined at 614, the computing platform 138 may, at 616, identify the type of machine and/or a particular machine, such as described above, from available machines. The computing platform 138 may determine the type of machine to use based on available assets on site or accessible by the computing platform 138, as provided at 628.

At 618, the computing platform 138 may determine if an autonomous machine is capable or if a human-operated machine will be needed. This determination may be based on available equipment at the worksite, what other jobs the equipment is currently involved with, expected completion times for other tasks, and other similar data. In the event that an autonomous machine is not capable or available, then an operator may be alerted at 626.

In the event that an autonomous machine is capable and available for the remediation, the computing platform 138 may generate, at 620, a remediation plan including path planning for the machine to travel from a current location to the location of the object, where to displace the object to if required, and any machine settings that may be required, such as a settings for equipment of a grader to smooth the surface.

At 622, the computing platform provides the remediation plan to the selected machine (and/or to an operator who may operate a human-operated machine).

After the instruction is sent, the computing platform 138 may, at 624, confirm using sensor data from one or more machines at the worksite if the remediation plan is complete. The confirmation may be triggered in response to the autonomous machine indicating it has completed the remediation plan. In some examples, other machines may employ their sensors in the area of the remediation to aid the computing platform 138 in determining if the remediation is complete. If not complete then an operator may be alerted at 626 or the remediation plan may be adjusted and re-instructed to the autonomous machine. If complete than the first machine 106 may proceed according to the work plan and compete the assigned task at the location the object previously occupied.

FIG. 7 shows an example system architecture for a computing system 700 associated with the computing platform 138. In some examples, other computing systems, such as the worksite controller 208 or other on-board computing systems of the first machine 106 and/or the second machine 108 and/or the mobile machine 114 and/or the aerial machine 116 can have architectures that are similar to the system architecture shown in FIG. 7. The computing system 700 can include one or more servers or other computing devices that include one or more processors 702, memory 704, and communication interfaces 706.

The processor(s) 702 can operate to perform a variety of functions as set forth herein. The processor(s) 702 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 702 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 702 can also access content and computer-executable instructions stored in the memory 704, and execute such computer-executable instructions.

The memory 704 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 702 to perform the operations described herein.

For example, the memory 704 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 702 and/or communication interface(s) 706 during execution thereof by the computing system 700. For example, the processor(s) 702 can possess local memory, which also can store program modules, program data, and/or one or more operating systems.

The memory 704 can store data and/or computer-executable instructions associated with the site map 210, the task progress predictor 212, the machine command generator 214, and/or the remediation engine 146 and/or other elements as described herein. The memory 704 can also store other modules and data 708 that can be utilized by the computing system 700 to perform or enable performing any action taken by the computing system 700. For example, the other modules and data 708 can include a platform, operating system, and/or applications, as well as data utilized by the platform, operating system, and/or applications.

The communication interfaces 706 can include transceivers, modems, interfaces, antennas, and/or other components that can transmit and/or receive data over networks or other data connections. In some examples, the communication interfaces 706 can be the wireless communication interfaces that the worksite controller 208 can use to send machine command data and to receive machine progress data.

INDUSTRIAL APPLICABILITY

The present disclosure provides systems and methods for autonomous worksite machinery to respond to obstacles encountered during completion of a task. Such systems and methods may be used to achieve better performance for one or more machine operations. Additionally, such systems and methods may be used to improve inefficiencies in machine operations. As noted above with respect to FIG. 6, an example method 600 of responding to an obstacle can include identifying and classifying the object or obstacle based on sensor data and generating a remediation plan that may be performed by one or more available additional machines. Using the information gathered by sensors of devices in the worksite, a remediation engine can cause the machines at the worksite to continue with assigned tasks and work plans while also removing obstacles or objects in the work plans without requiring one or more processes to stop, ceasing production at the worksite.

The computing platform 138 is also configured to provide such information to additional computing devices 122 used by, for example, a foreman at the worksite and/or to a computing device located at, for example, a remote material production plant. Such information can be used by, for example, the foreman to improve the efficiency of various operation activities at the worksite 104. Thus, the example systems and methods described above can provide considerable cost and time savings and reduce the time and labor required for various activities at the worksite 104 among other things that become apparent to one skilled in the art.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving first information, by a first processor and via a network, determined by a sensor disposed at a worksite, the first information including a first timestamp, and an indication of an object disposed at a first location at the worksite, wherein the first location is in a path of a first autonomous machine on a work plan at the worksite;
   receiving, by the first processor, an object classification of the object; providing, by the first processor and via the network, instructions to a second processor disposed at the worksite, wherein when executed by the second processor, the instructions cause the second processor to:
   determine that the object requires remediation to enable the first autonomous machine to complete the work plan;
   determine a remediation procedure comprising one or more actions to enable the first autonomous machine to complete the work plan;
   determine a second machine included in the remediation procedure from a set of machines located at the worksite based on capabilities of the second machine to perform the remediation procedure;

determine an adjusted work plan based on the first location, the object classification, the remediation procedure, and the second machine, the adjusted work plan comprising instructions for the first autonomous machine to proceed with the work plan by avoiding a region comprising the first location of the object and a remediation region associated with the remediation procedure, wherein the remediation region comprises an area in which the second machine will operate to perform the remediation procedure;
   provide the remediation procedure to the second machine;
   receive confirmation of completion of the remediation procedure from the second machine; and
   in response to receiving the confirmation of completion, cause causing the first autonomous machine to complete a task in the region as part of the adjusted work plan.

2. The method of claim 1, wherein the sensor is carried by the first autonomous machine traversing a work surface of the worksite, the sensor providing the first information and the second information.

3. The method of claim 1, wherein the object classification comprises stationary objects or non-stationary objects.

4. The method of claim 1, wherein the object classification comprises at least one of:
   machinery;
   personnel; or
   materials.

5. The method of claim 1, wherein the first information comprises image data and receiving the object classification comprises inputting the first information and the second information into a machine learning model trained for object recognition, the machine learning model configured to output the object classification.

6. The method of claim 1, wherein the instructions further cause the second processor to convey, to the first processor, an instruction to proceed with an adjusted work plan, the adjusted work plan configured to enable the first autonomous machine to perform a subsequent portion of the work plan outside of the region comprising the first location and the remediation region until the confirmation of completion of the remediation procedure is received.

7. The method of claim 6, wherein the adjusted work plan is based at least in part on the remediation procedure.

8. The method of claim 6, wherein the adjusted work plan comprises causing the first autonomous machine to proceed with the work plan at a reduced pace or proceed to a section of the work plan not obstructed by the object.

9. The method of claim 1, wherein the instructions to provide the remediation procedure to the second machine comprises:
   determining a second work plan for the second machine based on the object classification and tracking information for the object associated with the first location, wherein the second work plan comprises operations for the second machine within the remediation region and is distinct from the work plan of the first autonomous machine;
   conveying the second work plan to the second machine; and
   causing the second machine to proceed with the second work plan, wherein the second machine comprises a second autonomous machine.

10. A system, comprising:
   one or more processors;
   a sensor disposed at a worksite and in communication with the one or more processors; and

23 a memory operably connected to the one or more processors and storing instructions that, when executed by the one or more processors, cause the one or more processors to:

receive sensor data from the sensor, the sensor data including an indication of an object disposed at a location at the worksite, wherein the location is in a path of a first autonomous machine on a work plan at the worksite;

receive an object classification for the object;

determine that the object requires remediation to enable the first autonomous machine to complete the work plan;

determine, based on the object classification and the sensor data, a remediation procedure comprising one or more actions to remove the object from the path and enable the first autonomous machine to complete the work plan;

determine a second machine included in the remediation procedure from a set of machines located at the worksite based on capabilities of the second machine to perform the remediation procedure;

determine an adjusted work plan based on the location, the object classification, the remediation procedure, and the second machine, the adjusted work plan comprising instructions for the first autonomous machine to proceed with the work plan by avoiding a region comprising the location of the object and a remediation region associated with the remediation procedure, wherein the remediation region comprises an area in which the second machine will operate to perform the remediation procedure;

cause the second machine to perform the remediation procedure;

receive confirmation of completion of the remediation procedure from the second machine; and in response to receiving the confirmation of completion, cause the first autonomous machine to complete a task in the region as part of the adjusted work plan.

11. The system of claim 10, wherein determining the second machine comprises determining an availability of the second machine at the worksite.

12. The system of claim 11, wherein the instructions cause the one or more processors to further:

determine an adjusted work plan for the autonomous machine, wherein the adjusted work plan is based at least in part on avoiding a path of the second machine during the remediation procedure; and cause the autonomous machine to perform the adjusted work plan.

13. The system of claim 12, wherein the adjusted work plan comprises causing the first autonomous machine to proceed with the work plan at a reduced pace or proceed to a section of the work plan not obstructed by the object.

14. The system of claim 10, wherein the sensor is coupled to an autonomous aerial vehicle configured to monitor the worksite.

15. The system of claim 10, wherein the sensor is coupled to the first autonomous machine.

16. The system of claim 10, wherein causing the second machine to perform the remediation procedure comprises:

determining a second work plan for the second machine based on the object classification and location tracking information for the object, wherein the second work plan comprises operations for the second machine within the remediation region and is distinct from the work plan of the first autonomous machine;

conveying the second work plan to the second machine; and causing the second machine to proceed with the second work plan, wherein the second machine comprises a second autonomous machine.

17. The system of claim 10, wherein the object classification comprises stationary objects or non-stationary objects.

18. One or more non-transitory computer-readable media having instructions stored thereon that, when executed by one or more processors, cause the one or more processors to perform operations comprising:

receiving sensor data from a sensor positioned at a worksite, the sensor data including an indication of an object disposed at a location at the worksite, wherein the location is in a path of a first autonomous machine on a work plan at the worksite;

determining, based on the sensor data, tracking information for the object;

receiving an object classification for the object;

determining that the object requires remediation to enable the first autonomous machine to complete the work plan;

determining, based on the object classification and the sensor data, a remediation procedure comprising one or more actions to remove the object from the path and enable the first autonomous machine to complete the work plan;

determining a second machine included in the remediation procedure from a set of machines located at the worksite based on capabilities of the second machine to perform the remediation procedure;

determining an adjusted work plan based on the location, the object classification, the remediation procedure, and the second machine, the adjusted work plan comprising instructions for the first autonomous machine to proceed with the work plan by avoiding a region comprising the location of the object and a remediation region associated with the remediation procedure, wherein the remediation region comprises an area in which the second machine will operate to perform the remediation procedure;

causing the second machine to perform the remediation procedure;

receiving confirmation of completion of the remediation procedure from the second machine; and in response to receiving the confirmation of completion, causing the first autonomous machine to complete a task in the region as part of the adjusted work plan.

19. The one or more non-transitory computer-readable media of claim 18, further comprising:

determining an adjusted work plan for the autonomous machine, wherein the adjusted work plan is based at least in part on avoiding a path of the second machine during the remediation procedure; and causing the autonomous machine to perform the adjusted work plan.

20. The one or more non-transitory computer-readable media of claim 18, wherein causing the second machine to perform the remediation procedure comprises:

determining a second work plan for the second machine based on the object classification and location tracking information for the object, wherein the second work plan comprises operations for the second machine within the remediation region and is distinct from the work plan of the first autonomous machine;

conveying the second work plan to the second machine; and causing the second machine to proceed with the second work plan, wherein the second machine comprises a second autonomous machine.

* * * * *